March 13, 1928.
T. M. EYNON
DETECTOR FOR FLAT TIRES
Filed Sept. 16, 1919
1,662,381
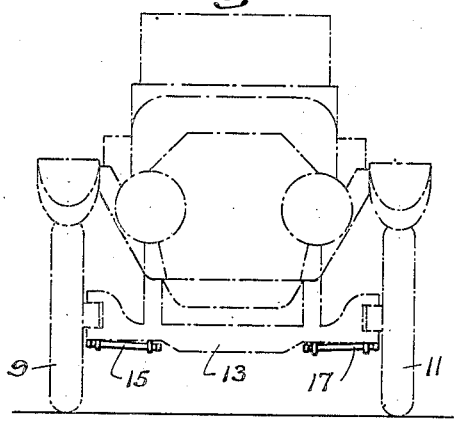
Fig. 1.
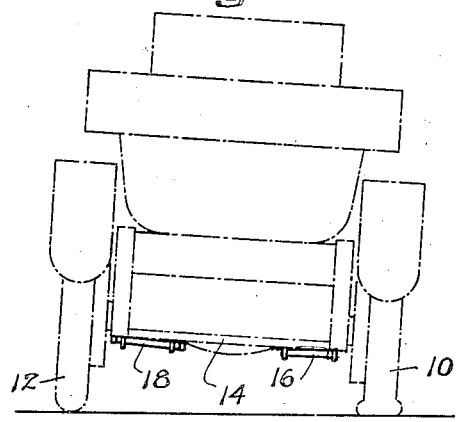
Fig. 2.
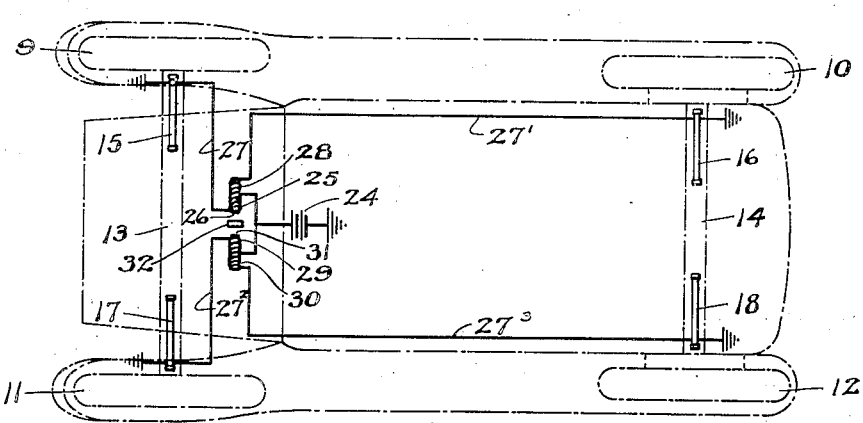
Fig. 3.
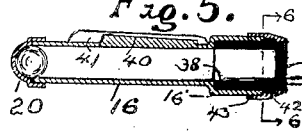
Fig. 5.
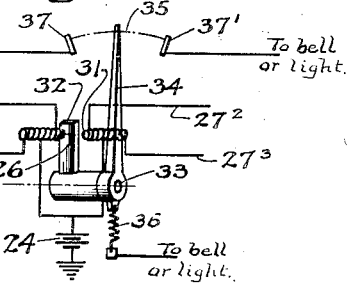
Fig. 4.
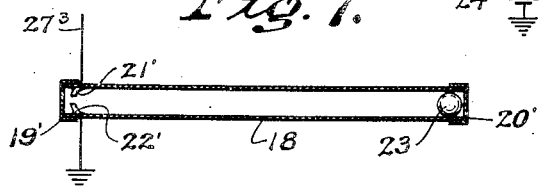
Fig. 6.
Fig. 7.
Inventor:-
Thomas M. Eynon.
By: *[signature]*
Attorney.

Patented Mar. 13, 1928.

1,662,381

UNITED STATES PATENT OFFICE.

THOMAS M. EYNON, OF PHILADELPHIA, PENNSYLVANIA, ASSIGNOR TO MARGARET Y. EYNON, OF PHILADELPHIA, PENNSYLVANIA.

DETECTOR FOR FLAT TIRES.

Application filed September 16, 1919. Serial No. 324,059.

The purpose of my invention is to indicate the fact of a single vehicle tire being flat by reason of the canting of that end of the vehicle, while distinguishing automatically from the canting of both ends of the vehicle together.

A further purpose is to reduce inertial movements of the contact closer by dash pot means.

A further purpose is to facilitate accurate placing of the contact-making device.

Further purposes will appear in the specification and in the claims.

I have preferred to illustrate my invention by but one form thereof, selecting a form which is practical, efficient and inexpensive and which at the same time well illustrates the principles of my invention.

Figure 1 is an outline front elevation of an automobile showing my invention applied thereto.

Figure 2 is a similar rear elevation showing the positions of the parts with one tire flat.

Figure 3 is a diagrammatic top plan view showing the electrical connections.

Figure 4 is a view partly perspective and partly diagrammatic showing the connections to the indicator.

Figure 5 is a longitudinal section of one form of contact device.

Figure 6 is a transverse section of Figure 5 upon lines 6—6.

Figure 7 is a longitudinal section through one of the contact tubes shown.

This application is intended to present an additional species of the broad invention illustrated, described and claimed in my application for patent for flat tire detector, Serial No. 267,396, filed December 18, 1918, in which the contacts are made by a solid gravity-actuated member and in which a different type of indicator is used, automatic in its movements but requiring interpretation by the driver, to distinguish between canting of a single end of the car, which might indicate a flat tire, and canting of both ends of the vehicle, such as is caused by lateral slope of the road.

The disclosure was broad in my original application indicated and the specific claims were directed to fluid operation and the continuous transverse tube was emphasized more than the separate tubes for the two sides at each end; and it is my purpose to claim specifically here, the separate self-contained constructions and the use of mechanical or solid, rather than fluid connection between the contacts.

Considering Figure 3, I show the wheels 9, 10, 11, 12 upon axles 13 and 14 and contact tubes 15, 16, 17 and 18 in juxtaposition to the wheels, supported preferably from the axles.

Each tube is shown as sealed at 19 and 20, or 19' and 20', (Figures 5, 6 and 7) to keep out dirt and moisture which might interfere with the operation, and contains contacts 21, 22, or 21', 22', one of which, at least, must be insulated from the tubing. The other may be grounded upon it or through it to any suitable frame part, to which the battery is also grounded, or may be omitted, its place being taken by the grounded metal of the tube.

For the solid (mechanical) gravity-actuate contact device I have selected a rolling ball 23 within the tube so that at the one end of its movement, the right in Figure 5 and the left in Figure 7, it will close the contacts 21 and 22 or 21' and 22' and complete the path of current from a grounded battery 24.

As will be seen the several circuits from the battery shown in Figures 3 and 4 pass through winding 25 and 28 of magnet 26 for tubes 15 and 16 respectively, and through windings 29 and 30 of electromagnet 31 for tubes 17 and 18 respectively.

The electromagnets 26 and 31 are located on opposite sides of an armature 32, pivoted upon an axis 33 and controlling a pointer 34. The pointer is held to the middle of the scale 35 by a tension spring 36 which serves also to pass current from any suitable source through the needle to contacts 37 or 37' to ring a bell, if desired, when the armature is thrown.

The tubes are so located as normally to slope toward the inside of the car, which is toward the left in Figure 5, and toward the right in Figure 7, holding the balls in the ends farthest from the contacts; but this slope is slight enough so that flattening of a tire will reverse the slope, causing the contact end of the tube to be the low end and resulting in the ball rolling to contact position. Any special means may be used to insure engagement of the ball with them and contact of the ball itself with the tubing to ground it where only one connection is made by it.

In Figure 5 the tube 16 is shown as a short tube having an enlarged end 16' receiving insulation 38 in which are imbedded contact wires 39 extending longitudinally and forming a track for the ball. These wires are joined to connection 27' and the ground respectively. Upon the upper surface of the tube is formed a leveling face 40 at an angle to the tube axis such that when it is horizontal, as determined by a level, the tube is at the proper cant for application to the axle by means of bracket 41. The insulation is flanged at 42 and is held in place by a cap 43.

The tube 18 in Figure 7 provides a longer movement for the ball and uses spring contacts.

In each of these the ball preferably fits closely enough in the bore of the tube to partly trap the air and have a cushioning effect—on the dash pot order—preventing inertial movement of the ball, but allowing it to move steadily toward the lower end. I prefer to secure this by providing for air flow past the ball rather than by outside openings because the ball must have clearance and the outside openings are objectionable both because they will clog and because, until they clog, they will admit water. Where a close fit between the ball and the tube is provided, special care is needed to prevent rusting of the parts. The best way to do this is to use brass or bronze or other rust-proof metal for them.

The windings 25 and 28 are balanced, as are also the windings 29 and 30, so that the currents through them will oppose each other and a flow of current through both of connections 27 and 27' upon one side, or 27² and 27³ upon the other side, because of either side of the vehicle resting low, on account of slope of the road, will not energize the electromagnets, but the energization of any one alone of the coils will cause energization of the electromagnet and throw the armature, giving indication by the needle and bell or light.

In operation, the automobile is driven, as usual, and the indicator shows no movement by reason of level road or slope of the road so that both ends of the side of the vehicle are low at the same time; but when one wheel only is low, the corresponding tube slopes toward the contacts and its ball moves to the contact end, causing energization of the electromagnet and throwing of the needle.

I recognize that there are many ways in which the condition of the tire may be indicated through taking advantage of the cant of the machine and with individual, independent operating devices close to the several wheels; also that there is a great deal of variety possible in the gravity-actuated mechanical means for operating an indicator. The forms which I have chosen have been selected because of their convenience, reliability and simplicity and, as to the ball, the ease of protecting from inertial throw.

Having thus described my invention, what I claim as new and desire to secure by Letters Patent is:

1. A contact maker for a flat tire detector, comprising a tube and a gravity-operated movable contact maker within the tube in combination with a face upon the contact maker adapted to lie in horizontal position and when the tube is properly set by leveling to act as a means of ready determination of the correct position of the tube.

2. In a flat tire detector, a contact maker comprising a tube containing insulated contacts in the bottom at one end of the tube, a ball movable in the tube and having air dash pot action therein by reason of diameter nearly equal the interior diameter of the tube, the ball rolling upon the contacts to electrically connect them, and a closure for the contact end of the tube to prevent air escape there when the ball is in movement.

THOMAS M. EYNON.